A. E. STACEY, Jr.
APPARATUS AND METHOD FOR CONTROLLING TEMPERATURE AND HUMIDITY.
APPLICATION FILED SEPT. 6, 1917.

1,330,920.

Patented Feb. 17, 1920.

INVENTOR.
Alfred E. Stacey Jr.
By Wilhelm & Parker.
ATTORNEYS.

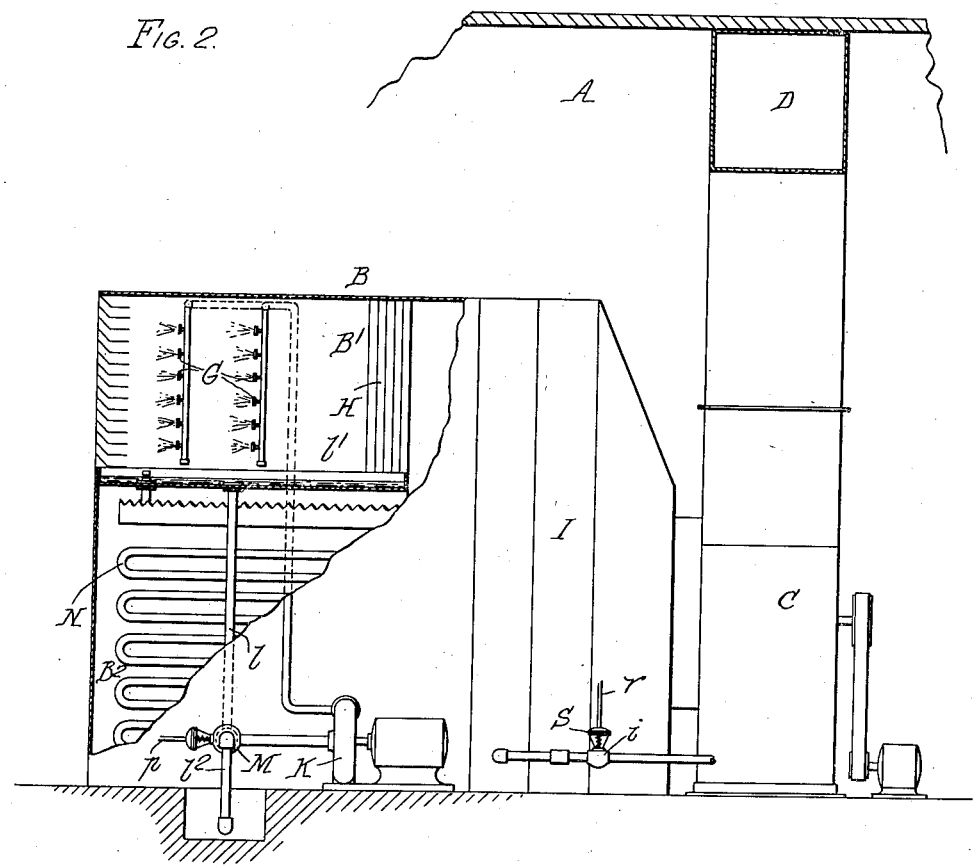

UNITED STATES PATENT OFFICE.

ALFRED E. STACEY, JR., OF CHICAGO, ILLINOIS, ASSIGNOR TO CARRIER ENGINEERING CORPORATION, OF NEW YORK, N. Y.

APPARATUS AND METHOD FOR CONTROLLING TEMPERATURE AND HUMIDITY.

1,330,920. Specification of Letters Patent. Patented Feb. 17, 1920.

Application filed September 6, 1917. Serial No. 190,059.

*To all whom it may concern:*

Be it known that I, ALFRED A. STACEY, Jr., a citizen of the United States, residing at Chicago, in the county of Cook and State of Illinois, have invented a new and useful Improvement in Apparatus and Methods for Controlling Temperature and Humidity, of which the following is a specification.

This invention relates to a system or method and apparatus for controlling the temperature and humidity conditions in rooms where the humidity varies considerably, as where moisture and heat are being given off by material contained in the room. This invention is ordinarily used in connection with dehumidifying work, that is, where the moisture content of the room is to be reduced, usually at a point below that of the outside air, so that it is necessary to use refrigeration to accomplish this result. The invention is especially useful for example for controlling the conditions in the cooling rooms of slaughter houses and meat packing houses. The meat when it is brought into these rooms is moist and more or less at the natural temperature, or temperature of the outside atmosphere, and gives off both heat and moisture. It is necessary to both cool the meat and prevent the moisture therefrom from condensing without drying the meat, or at least without drying it beyond a desired point. A great deal of trouble is experienced in cooling rooms from the condensation of moisture on the ceiling and walls of the room. The condensed moisture is apt to fall back on the product, which is very unsanitary, and the condensed moisture keeps the rooms in a damp and objectionable condition. In cooling meat it is desirable not to dry it any more than necessary as it loses weight in drying, and the drying also discolors the meat. The variations in the humidity conditions in the meat cooling rooms are very pronounced at different times because at times there may be but a small quantity of meat in the room while at other times there may be large quantities of meat in the rooms, thus making a great difference in the amount of heat and moisture being given off. The system must be able to take care of the greatly differing conditions due to such causes.

One of the objects of the invention is to control the temperature and humidity conditions in rooms or chambers where moisture is being added to the air, as for example, when moisture is being given off by material contained in the room, and at the same time to supply the room with air at a relatively low temperature for cooling the rooms, and to do this without causing condensation of moisture in the rooms.

The apparatus for maintaining the desired conditions of temperature and relative humidity within the room comprises a fan for the circulation of air; an air conditioner in which the air is treated with water or brine, the temperature of which is varied by passing it over or by-passing it around a refrigerating or cooling means; a heater which heats the air after it passes through the conditioner and which may be located either at the inlet or discharge side of the fan (or other means for raising the temperature in the room may be used); and a hygrostat or wet bulb thermostat which controls the temperature of the spray liquid for regulating the dew point in the air conditioner by either allowing the liquid to pass over the cooling means or be by-passed so as not to pass over the cooling means. The temperature of the room is controlled at some definite point, as by regulating the admission of steam to the coil of the heater, or otherwise. The hygrostat or wet bulb thermostat will control either the relative humidity or the wet bulb temperature which, in turn, will determine the relative humidity. When a hygrostat is employed in the room, it can maintain a constant relative humidity regardless of fluctuations in temperature in the room; and the heater can be operated by hand to give a near enough regulation of the room temperature. When, however, a wet bulb thermometer is used to control the humidity, a dry bulb thermometer is also preferably used for controlling the air heating means so as to maintain the correct relation between the wet and dry bulb temperatures to give the required relative humidity in the room. Since the product in the room gives off heat as well as moisture, a greater amount of product will require air at a lower dew point to maintain the percentage of humidity, while the lower dew point will provide the necessary amount of cooling for the product. Whenever the amount of refrigeration supplied is greater than required for cooling, then the thermostat in the room will operate the heater or other means and maintain the temperature as required. In addition to varying the temperature of the spray liquid, the proportion of fresh outside air and return air from the room admitted to the air conditioner is also preferably regulated under the control of the hygrostat or wet bulb thermostat in the room.

The accompanying drawings disclose an apparatus for carrying out the hereindescribed method. In said drawings—

Fig. 2 is an elevation, partly in section, showing the air conditioner or dehumidifier.

Figure 1:
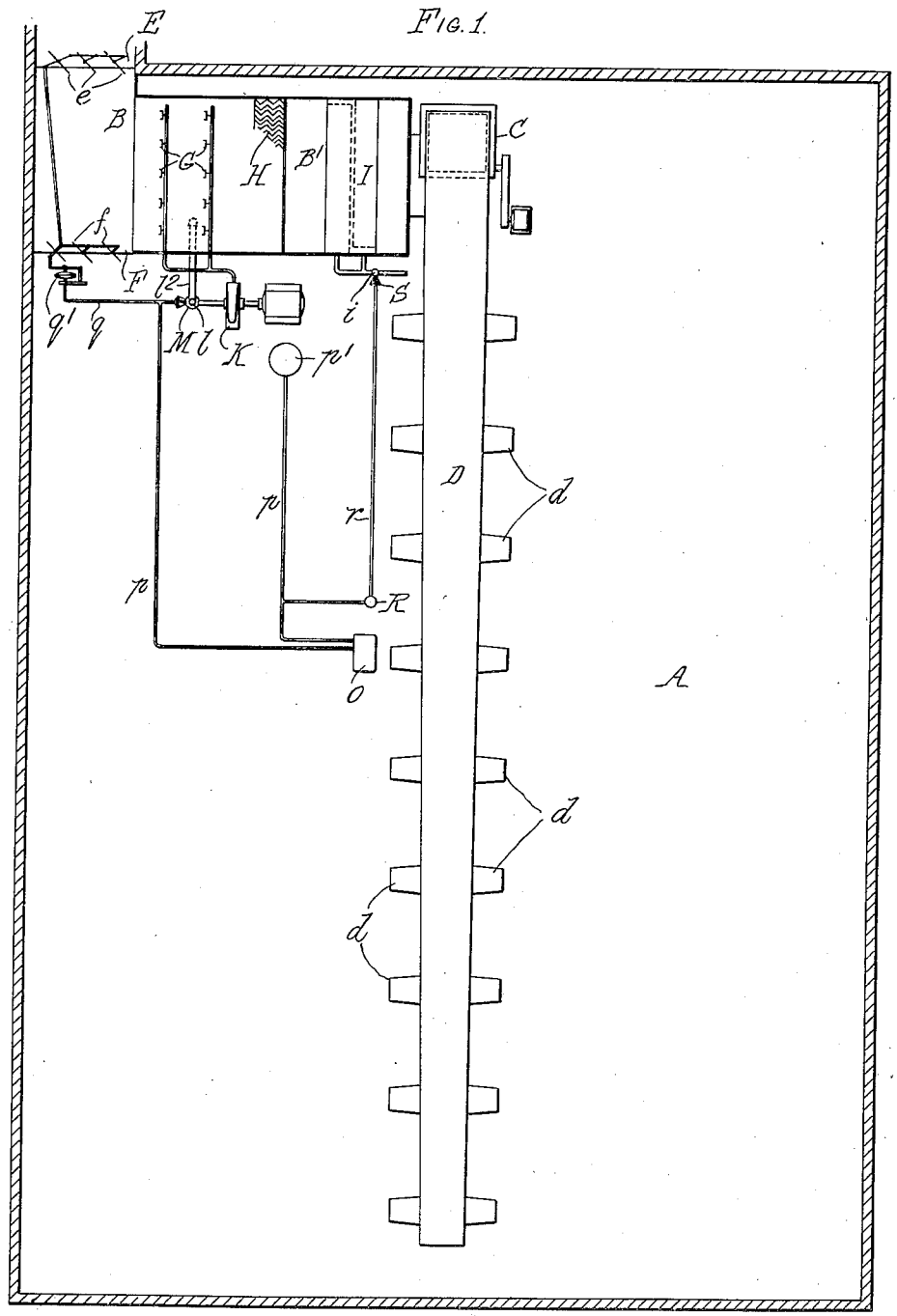
Figure 1 is a diagrammatic plan view of the apparatus.

A indicates a room or chamber in which the temperature and humidity conditions are to be controlled and which may contain meat or other material which gives off moisture. B represents an air conditioning or de-humidifying apparatus through which the air for delivery to the room passes and in which the dew point of the air is regulated. The casing of this apparatus is preferably divided into an upper air conditioning chamber B' and a lower liquid cooling or refrigerating chamber B². C represents a fan which draws air through the conditioning chamber B' and delivers the same by means of a suitable duct or ducts D to the room A. Preferably the air is discharged into the room A through nozzles $d$ which are located at suitable intervals along the supply duct and discharge the air under pressure into the room and are so disposed that the air discharging from the nozzles induces an active circulation of the larger volume of air in the room A. The conditioning chamber B' is shown as having a fresh air inlet opening E controlled by suitable dampers $e$ and a return air inlet opening F controlled by dampers $f$. The air which passes through the conditioning chamber and is delivered to the room may be either all fresh outside air, return air from the room or a properly proportioned mixture of both, depending upon the adjustments of the dampers $e$ and $f$ as hereinafter explained. G represents spray nozzles for discharging water or brine in the form of a fine spray or mist into the conditioning chamber B' for varying the temperature and humidity of the air passing through the conditioning chamber, and H represents an eliminator of any usual or suitable construction through which the air passes after leaving the spray for removing the entrained moisture or free particles of spray liquid from the air. I represents a heater for heating or tempering the conditioned air which is delivered to the room A. The heater shown is located in the air trunk between the eliminator H and the fan so that the air passes through the same on its way to the room A, but the heater can be differently located, either in the air trunk at either side of the fan, or in the room A. The heater can be of any suitable kind, as for example, an ordinary steam heating coil having a diaphragm valve $i$ for controlling the supply of steam to the coil for regulating the temperature of the air. The spray liquid is delivered under pressure to the nozzles G by a pump K which draws the supply from the spray liquid collecting in the air conditioning apparatus, the spray liquid being circulated and used over and over again. The pump intake connects by a pipe $l$ with a collecting well $l'$ in the bottom of the air conditioning chamber B' and by a pipe $l^2$ with the bottom of the refrigerating chamber B². A suitable diaphragm or motor actuated valve M controls the two pipes $l$ $l^2$ so that, depending upon the position of this valve, the pump draws the spray liquid either from the air conditioning chamber or from the refrigerating chamber or partially from both. In the refrigerating chamber is located a refrigerating coil N or other suitable liquid cooling means and the spray liquid is adapted to overflow from the collecting well $l'$ of the air conditioning chamber and flow down over the refrigerating coil to be cooled thereby. The temperature of the spray liquid and the dew point of the air treated in the air conditioning chamber are thus varied by actuating the diaphragm valve M so as to cause the pump to draw the liquid either from the air conditioning chamber or the refrigerating chamber or partially from both sources. The air conditioning or dehumidifying apparatus above briefly described is constructed substantially as more fully disclosed in Patent 1,078,608, granted November 18, 1913, to W. H. Carrier, assignor, but the apparatus could be of any other suitable construction adapted to subject the air to a liquid spray and vary the temperature of the spray liquid for regulating the dew point of the treated air.

O represents an instrument such as a hygrostat or wet bulb thermostat of any suitable construction which is located in the room A or otherwise, so as to respond to changes in humidity in the room, and is suitably connected to the diaphragm valve M for actuating the same. As shown, this hygrostat or wet bulb thermostat is interposed in an air pipe or line $p$ leading from an air reservoir $p'$ or other suitable source of compressed air, to the diaphragm valve M. If the relative humidity or wet bulb temperature in the room A changes, the hygrostat or wet bulb thermostat will, through the air connections with the diaphragm valve M actuate the same so as to cause more or less of the spray liquid to be drawn from the refrigerating chamber to thereby more or less lower the temperature of the liquid spray and regulate the dew point in the air conditioning chamber.

The hygrostat or wet bulb thermostat O is also preferably connected by a branch air line $q$ with a diaphragm or motor $q'$ for actuating the fresh air and return air dampers $e$ and $f$. The diaphragm or motor $q'$ is suitably connected to these dampers so that it will operate to simultaneously close the fresh air dampers and open the return air dampers or vice versa. In this way the temperature in the air conditioning chamber and consequently the dew point of the air being treated therein is regulated conjointly by varying the temperature of the spray liquid and varying the proportions of fresh and return air admitted to the air conditioning chamber.

R represents a thermostat which is located so as to be affected by changes in the temperature of the room for the purpose of turning on and shutting off the air heater I. As shown, this thermostat controls the flow of compressed air through a branch air line $r$ leading from the air line $p$ to a diaphragm valve S which controls the supply of steam to the air heater. If the dew point of the air supplied to the room A under the control of the hygrostat or wet bulb thermostat O reduces the temperature in the room below the degree which it is desired to maintain in the room, the thermostat R will operate through the connections stated to turn on the heater and thus raise the temperature of the air delivered to the room, and consequently the temperature in the room A or to secure this result through other means. The wet bulb thermostat O and the thermostat R thus act to control the wet bulb temperature and the dry bulb temperature in the room A, and thereby determine the relative humidity in the room. When a hygrostat is employed for the instrument O instead of a wet bulb thermostat, it will directly control the relative humidity in the room and the air heater can be regulated or actuated by hand to give a sufficiently accurate regulation of the room temperature and in such case the thermostat R and its connections are not essential and can be omitted.

In the operation of the apparatus, if the relative humidity in the room A increases beyond the point for which the instrument O is set, this instrument will operate through the medium of the diaphragm controlling valve M and the fresh and return air inlet dampers $e$ and $f$ and their connections to lower the temperature in the air conditioning chamber and lower the dew point of the air admitted to the room A. The relative humidity in the room will thus be reduced and the room cooled until the desired relative humidity is secured. If the air supplied to the room lowers the temperature thereof below the desired point, the thermostat R through its connections and the diaphragm valve S will turn on the supply of steam to the heater until the temperature of the room is raised to the desired degree. In this way the desired relative humidity and low temperature is maintained in the room and the condensation of moisture given off by the meat or contents of the room prevented, while the room is nevertheless maintained at the desired temperature and humidity to prevent the undue drying of the material.

Since the air used for regulating the humidity in the room is circulated and is washed before it is returned to the room, and the impurities are removed therefrom with the entrained moisture by the eliminators in the washing apparatus, the mold spores are removed from the air and the molding of the product is prevented.

I claim as my invention:—

1. In an apparatus for cooling a room in which varying amounts of water vapor are added to the atmosphere and for controlling the vapor pressure in the room to prevent condensation of moisture, the combination of means for supplying air to the room, means for causing an intimate contact of said air with a liquid for cleansing the air and determining its dew point, an instrument which acts in response to changes in humidity in the room, means for cooling said liquid, a device controlled by said instrument for varying the cooling effect of said cooling means on said liquid to regulate the dew point of the air which is supplied to the room, and means for supplying heat to the room.

2. In an apparatus for cooling a room in which varying amounts of water vapor are added to the atmosphere and for controlling the vapor pressure in the room so as to prevent condensation of moisture, the combination of means for supplying air to the room, devices for spraying liquid into said air, means for collecting the spray liquid and returning it to said spray devices, means for cooling said spray liquid, an instrument which acts in response to changes in humidity in the room, a device controlled by said instrument for varying the volume of liquid cooled by said cooling means to reduce more or less the temperature of the spray liquid and regulate the dew point of the air which is supplied to the room, and means for supplying heat to the room.

3. In an apparatus for cooling a room in which varying amounts of water vapor are added to the atmosphere and for controlling the vapor pressure in the room so as to prevent condensation of moisture, the combination of means for supplying air to the room, devices for spraying liquid into said air, means for collecting the spray liquid and returning it to said spray devices, means for cooling said spray liquid, an instrument which acts in response to changes in humidity in the room, a device controlled by said instrument for varying the volume of liquid cooled by said cooling means to reduce more or less the temperature of the spray liquid and regulate the dew point of the air which is supplied to the room, and thermostatically controlled means responsive to temperature changes in the room for regulating the temperature in the room.

4. In an apparatus for cooling a room in which varying amounts of water vapor are added to the atmosphere and for controlling the vapor pressure in the room so as to prevent condensation of moisture, the combination of means for supplying air to the room, devices for spraying liquid into said air, means for collecting the spray liquid and returning it to said spray devices, means for cooling said spray liquid, a wet bulb thermostat which responds to atmospheric changes in the room, a device controlled by said wet bulb thermostat for varying the volume of liquid cooled by said cooling means to reduce more or less the temperature of the spray liquid and regulate the dew point of the air which is supplied to the room, a heater, and a thermostat responsive to temperature changes in the room for controlling said heater to regulate the temperature in the room.

5. In an apparatus for controlling the vapor pressure content in a room where varying amounts of water vapor are added to the atmosphere, the combination of an air conditioning chamber, means for causing air to pass through said air conditioning chamber and enter said room, means for spraying liquid into the air in said air conditioning chamber, means for admitting outside air and return air from the room to said air conditioning chamber, an instrument which acts in response to changes in humidity in the room, mechanism controlled by said instrument for varying the temperature of said spray liquid and the proportions of outside and return air admitted to said chamber to regulate the dew point of the air which is supplied to the room, and means for supplying heat to the room.

6. The herein described method of cooling a room in which varying amounts of water vapor are added to the atmosphere and controlling the vapor pressure in the room to prevent condensation of moisture, which consists in supplying air to said room, spraying a cool liquid into said air for cooling the same before the air enters said room, varying the temperature of said spray liquid under the control of the humidity in said room to regulate the dew point of said air, and regulating the temperature of the room.

7. The herein described method of cooling a room in which varying amounts of water vapor are added to the atmosphere and controlling the vapor pressure in the room to prevent condensation of moisture, which consists in supplying air to said room, spraying a liquid into said air for cooling the same before the air enters said room, refrigerating more or less of said spray liquid under the control of the humidity in said room to lower more or less the temperature of the spray liquid and regulate the dew point of said air, and regulating the temperature in the room.

8. The herein described method of cooling a room in which varying amounts of water vapor are added to the atmosphere and controlling the vapor pressure in the room to prevent condensation of moisture, which consists in supplying air to said room, spraying a liquid into said air before the air enters said room, refrigerating more or less of said spray liquid under the control of the humidity in said room to lower the temperature of the same and regulate the dew point of said air, heating said air, and regulating the heat to maintain a substantially predetermined temperature in the room.

Witness my hand this 31st day of July, 1917.

ALFRED E. STACEY, Jr.

Witnesses:
C. WEBSTER ANDREWS,
LOTTA O. SLOAN.